United States Patent
Yamamoto

(10) Patent No.: US 9,078,213 B2
(45) Date of Patent: Jul. 7, 2015

(54) MOBILE COMMUNICATION TERMINAL APPARATUS, METHOD OF CONTROLLING POWER CONSUMPTION OF MOBILE COMMUNICATION TERMINAL APPARATUS, AND RECORDING MEDIUM

(75) Inventor: Kouji Yamamoto, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 205 days.

(21) Appl. No.: 13/583,538

(22) PCT Filed: Feb. 2, 2011

(86) PCT No.: PCT/JP2011/052127
§ 371 (c)(1), (2), (4) Date: Sep. 7, 2012

(87) PCT Pub. No.: WO2011/111443
PCT Pub. Date: Sep. 15, 2011

(65) Prior Publication Data
US 2013/0065653 A1    Mar. 14, 2013

(30) Foreign Application Priority Data
Mar. 8, 2010   (JP) ................. 2010-050204

(51) Int. Cl.
*H04B 1/38*   (2006.01)
*H04W 52/02*   (2009.01)
(Continued)

(52) U.S. Cl.
CPC .......... *H04W 52/0229* (2013.01); *H04W 64/00* (2013.01); *H04W 88/06* (2013.01); *G01S 5/0263* (2013.01); *H04W 4/02* (2013.01); *H04W 52/0248* (2013.01)

(58) Field of Classification Search
USPC .............. 455/41.2, 41.3, 435.1, 435.2, 550.1, 455/560, 561, 572, 574, 456.1–456.6; 370/328, 338
See application file for complete search history.

(56) References Cited

U.S. PATENT DOCUMENTS

2002/0052225 A1   5/2002   Davis et al.
2008/0057956 A1*  3/2008   Black et al. ................ 455/435.1
(Continued)

FOREIGN PATENT DOCUMENTS

JP   2004-165755 A    6/2004
JP   2006-295643 A   10/2006
(Continued)

OTHER PUBLICATIONS

Search Report dated Sep. 4, 2013, issued by the European Patent Office in counterpart European Application No. 11753105.3.
(Continued)

*Primary Examiner* — Nhan Le
(74) *Attorney, Agent, or Firm* — Sughrue Mion, PLLC

(57) ABSTRACT

A first position information generation unit (130) generates, based on a first radio signal received by a first wireless communication unit (110), first position information representing a position where the first radio signal is received. A second position information generation unit (140) generates, using the first position information, second position information representing a position where a second wireless communication unit (120) can receive a second radio signal. A wireless communication operation determination unit (150) determines, based on the generated first and second position information, whether the operation by the second wireless communication unit is possible. A power supply control unit (160) executes power supply control of the second wireless communication unit in accordance with a determination result. This allows to uniquely determine the position information of a mobile communication terminal apparatus by simple signal processing at a low cost and implement power supply control of wireless communication functions based on the position information.

8 Claims, 6 Drawing Sheets

(51) Int. Cl.
*G01S 5/02* (2010.01)
*H04W 64/00* (2009.01)
*H04W 88/06* (2009.01)
*H04W 4/02* (2009.01)

(56) References Cited

U.S. PATENT DOCUMENTS

2009/0161639 A1* 6/2009 Ostergren ............. 370/338
2009/0247158 A1 10/2009 Hara et al.
2010/0189087 A1* 7/2010 Hara et al. ............. 370/338

FOREIGN PATENT DOCUMENTS

| | | |
|---|---|---|
| JP | 2008-60742 A | 3/2008 |
| JP | 2008-66781 A | 3/2008 |
| JP | 2009-44659 A | 2/2009 |
| JP | 2009-201104 A | 9/2009 |

OTHER PUBLICATIONS

International Search Report for PCT/JP2011/052127 dated Apr. 12, 2011, English Translation.

* cited by examiner

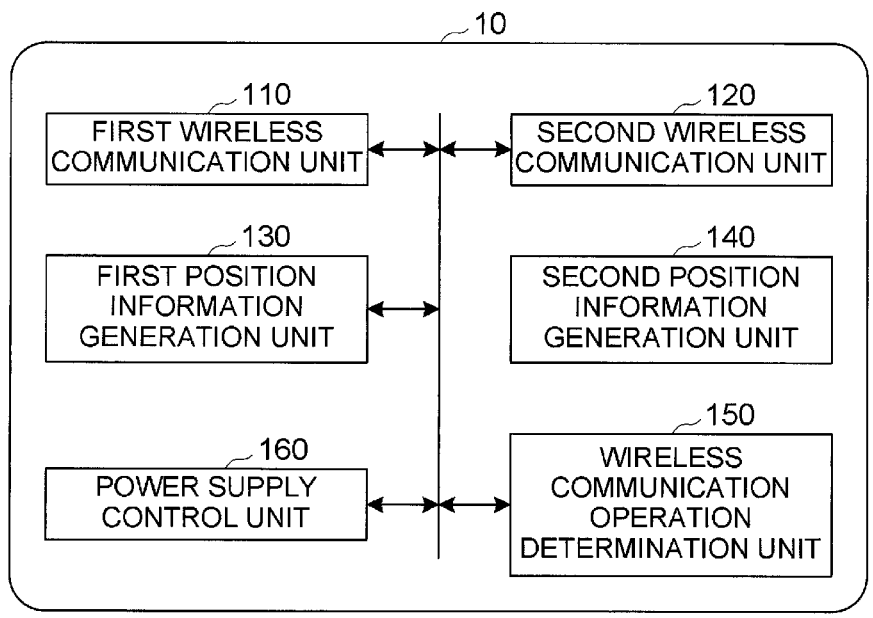
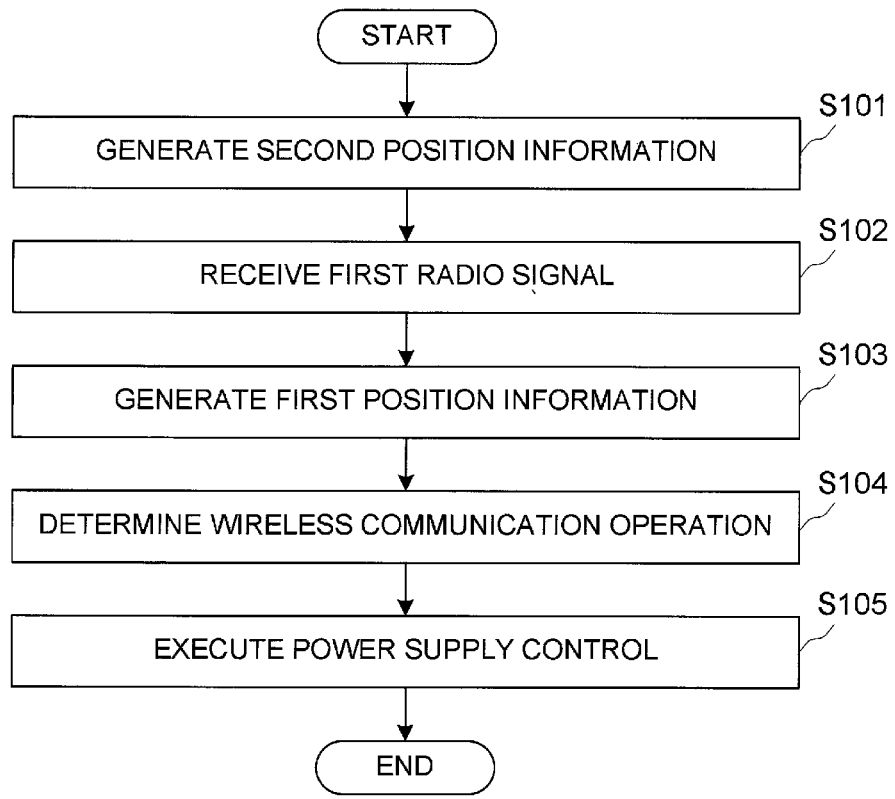

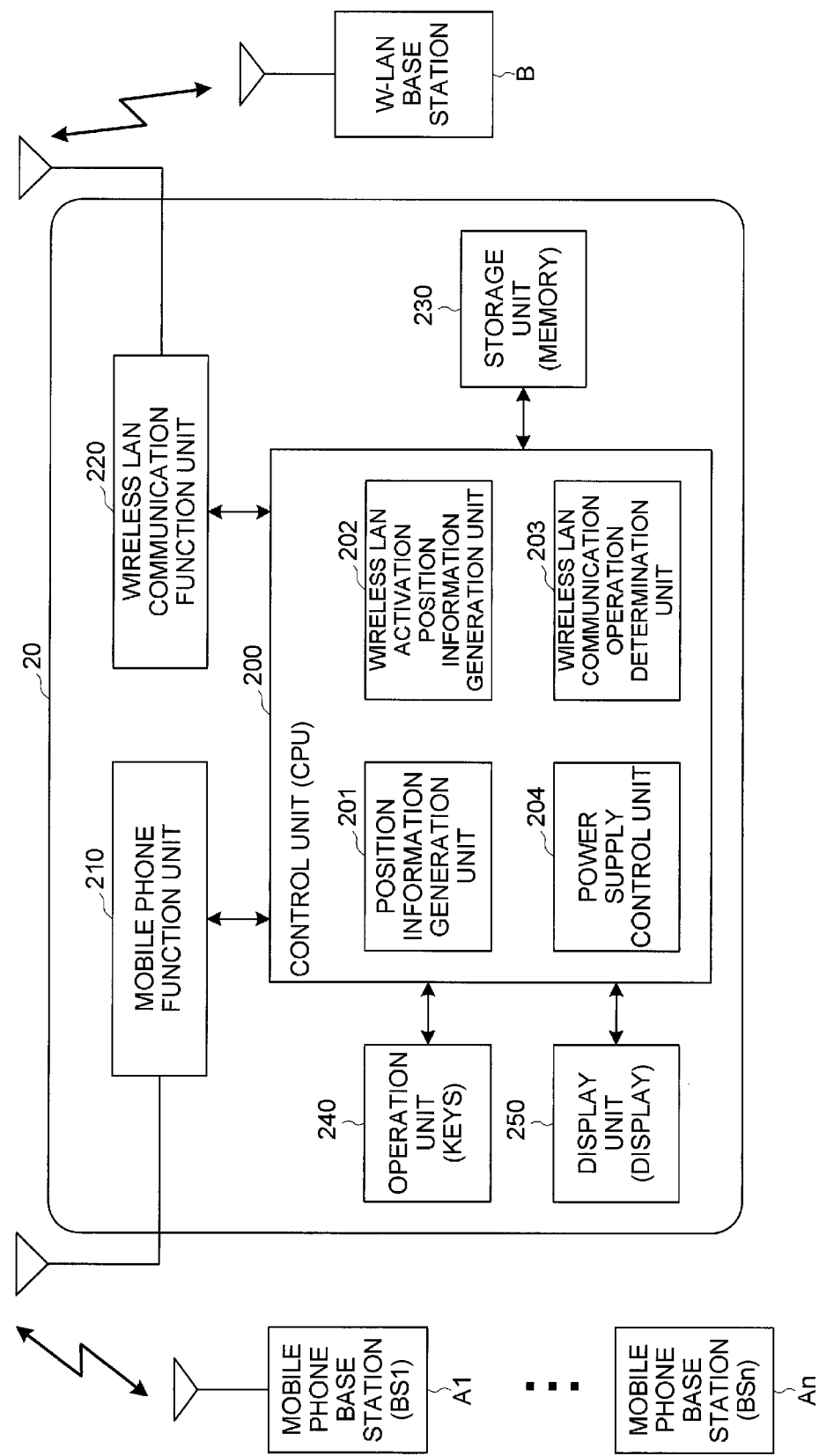

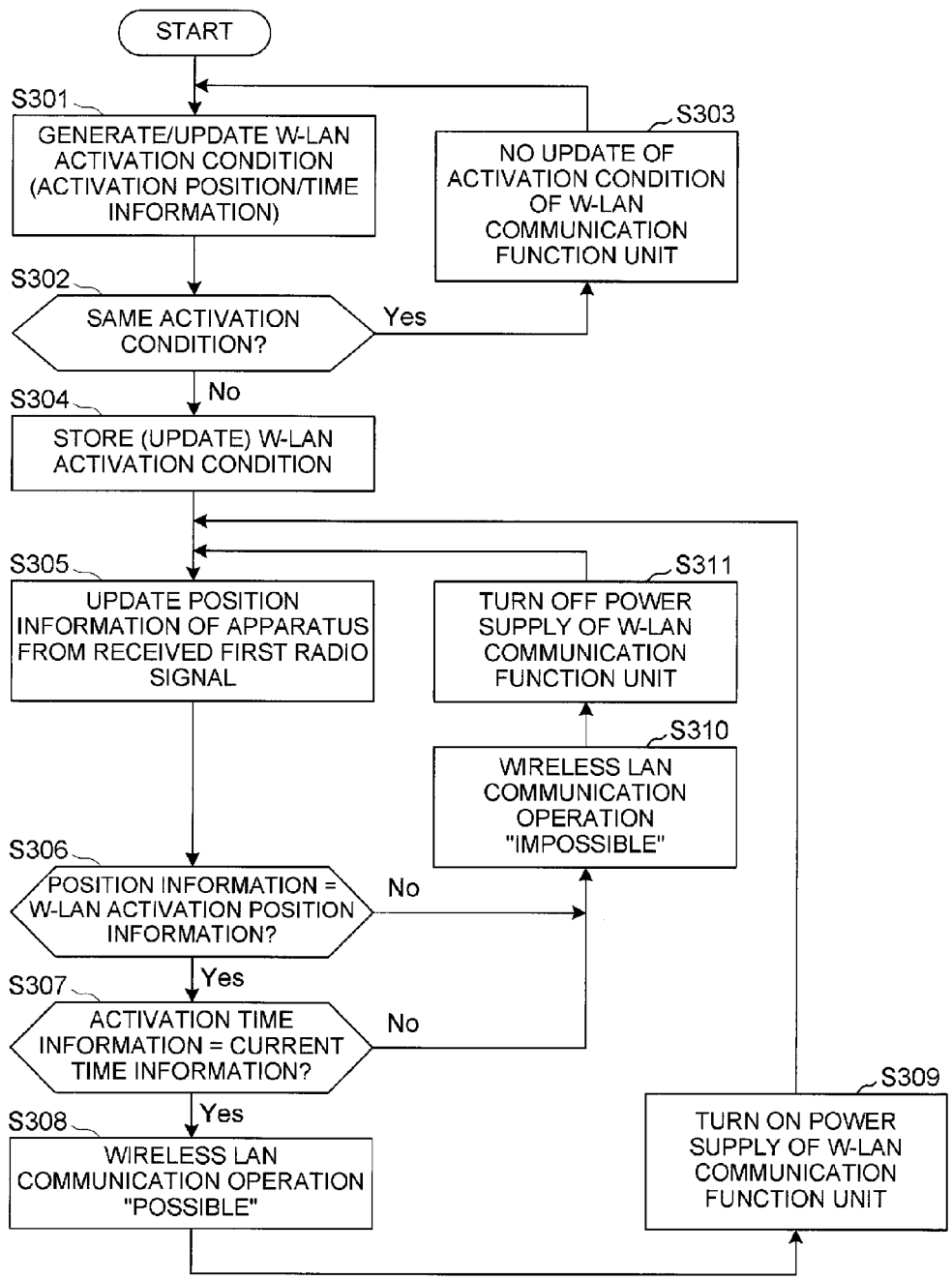

MOBILE COMMUNICATION TERMINAL APPARATUS, METHOD OF CONTROLLING POWER CONSUMPTION OF MOBILE COMMUNICATION TERMINAL APPARATUS, AND RECORDING MEDIUM

CROSS REFERENCE TO RELATED APPLICATIONS

This application is a National Stage of International Application No. PCT/JP2011/052127 filed Feb. 2, 2011, claiming priority based on Japanese Patent Application No. 2010-050204 filed Mar. 8, 2010, the contents of all of which are incorporated herein by reference in their entirety.

TECHNICAL FIELD

The present invention relates to a mobile communication terminal apparatus, a method of controlling the power consumption of a mobile communication terminal apparatus, and a recording medium and, more particularly, to a mobile communication terminal apparatus having a plurality of wireless communication functions, a method of controlling the power consumption of a mobile communication terminal apparatus, and a recording medium.

BACKGROUND ART

In recent years, mobile communication terminal apparatuses each having different wireless communication functions by different wireless band signals in the single terminal apparatus have become widespread.

For example, there exists a mobile communication terminal apparatus having both a mobile phone function of performing wireless communication as a so-called third-generation (to be referred to as "3G" hereinafter) mobile phone and a W-LAN communication function of performing wireless communication by connecting to an access point of wireless LAN (Wireless-Local Area Network: to be referred to as "W-LAN" hereinafter) communication. Such a mobile communication terminal apparatus is used not only as a mobile phone device but also as a W-LAN communication terminal apparatus such as an IP phone terminal or a high-speed Internet access terminal.

However, W-LAN communication by the mobile communication terminal apparatus can be executed only in a place where W-LAN communication is executable, for example, a home, an office, or a hot spot where a W-LAN connection service is provided. If the W-LAN communication function of the mobile communication terminal apparatus maintains an operative state even in a place where W-LAN connection is impossible, the W-LAN communication function wastes power.

To prevent the mobile communication terminal apparatus having the W-LAN communication function for wasting power, it is necessary to suppress wasteful power consumption by the W-LAN communication function under circumstances where the W-LAN communication function is unusable.

Techniques to solve this problem have been known, including a technique (patent literature 1) of detecting the position information of a mobile terminal using signals from GPS (Global Positioning System) satellites and comparing the detected position information with the position information of an access point registered in advance so as to control the power supply of a wireless LAN adapter, a technique (patent literature 2) of receiving notification information transmitted from a mobile phone base station to represent the presence/absence of a wireless LAN base station and controlling the power supply of a wireless LAN communication unit based on the received notification information, and a technique (patent literature 3) of storing the threshold of reception signal strengths from a plurality of adjacent base stations in cellular communication at a place where a wireless LAN access point can be detected and controlling the power supply of a wireless LAN communication unit based on the threshold.

RELATED ART LITERATURE

Patent Literature

Patent Literature 1: Japanese Patent Laid-Open No. 2004-165755
Patent Literature 2: Japanese Patent Laid-Open No. 2006-295643
Patent Literature 3: Japanese Patent Laid-Open No. 2008-66781

DISCLOSURE OF INVENTION

Problem to be Solved by the Invention

However, in the technique described in patent literature 1, position detection is performed using the GPS. For this reason, the mobile communication terminal apparatus needs to be equipped with a device dedicated to position detection and therefore becomes expensive.

The technique described in patent literature 2 requires a server apparatus or the like to manage in advance the information of wireless LAN base stations existing in the communicable range of a mobile phone base station. Hence, high cost is necessary for managing the information of the wireless LAN base stations.

In the technique described in patent literature 3, the position information of the mobile terminal apparatus is determined in accordance with the threshold of the reception signal strength from each mobile phone base station. The reception signal strength may contain an error depending on the reception quality of the reception signal even at the same position. For this reason, to uniquely determine the position information of the mobile terminal apparatus, the error needs to be corrected by advanced cumbersome signal processing.

The present invention has been made to solve the above-described problems, and has as its exemplary object to cause a mobile communication terminal apparatus including different wireless communication means to uniquely determine the position information of the mobile communication terminal apparatus by simple signal processing at a low cost and implement power supply control of the wireless communication functions based on the position information.

Means of Solution to the Problem

In order to achieve the above exemplary object, there is provided a mobile communication terminal apparatus including first wireless communication means for transmitting/receiving a first radio signal, second wireless communication means for transmitting/receiving a second radio signal to/from a second wireless communication base station, first position information generation means for generating, based on the first radio signal received by the first wireless communication means, first position information representing a position where the first radio signal is received, second position information generation means for generating, as second position information, information representing a position where wireless communication is possible between the second wireless communication means and the second wireless communication base station out of the first position information, wireless communication operation determination means for determining, based on the first position information and the second position information, whether a wireless communication operation by the second wireless communication means is possible, and power supply control means for performing power supply control of the second wireless communication means in accordance with a determination result of the wireless communication operation determination means.

Effect of the Invention

According to the present invention, it is possible to generate, based on the first radio signal transmitted from the first wireless communication base station, the first position information representing the position where the first radio signal is received and determine, using the first position information, whether the wireless communication operation by the second wireless communication means is possible. That is, it is possible to uniquely represent the position information of the apparatus using the system in the first wireless communication and determine, based on the position information, whether the wireless communication operation by the second wireless communication means is possible.

Hence, the mobile communication terminal apparatus having different wireless communication functions determines, based on the position information of the apparatus generated using a signal received by one wireless communication function, whether the operation of the other wireless communication function is possible, and executes power supply control in accordance with the determination result, thereby suppressing unnecessary power consumption of the mobile communication terminal apparatus and prolonging the operable time or so-called standby time.

In addition, the position information of the apparatus is generated using the signal received by the wireless communication means provided in the mobile communication terminal apparatus according to the present invention. It is therefore possible to suppress unnecessary power consumption of the mobile communication terminal apparatus by easy signal processing at a low cost and prolong the standby time without needing an expensive device, base station information management, and cumbersome signal processing.

BRIEF DESCRIPTION OF DRAWINGS

FIG. 1 is a block diagram showing the arrangement of a mobile communication terminal apparatus according to the first exemplary embodiment of the present invention;

FIG. 2 is a flowchart showing the operation of the mobile communication terminal apparatus according to the first exemplary embodiment of the present invention;

FIG. 3 is a block diagram showing the arrangement of a mobile communication terminal apparatus according to the second exemplary embodiment of the present invention;

FIG. 7 is a flowchart showing the power supply control operation of the mobile communication terminal apparatus according to the third exemplary embodiment of the present invention.

BEST MODE FOR CARRYING OUT THE INVENTION

Figure 4:
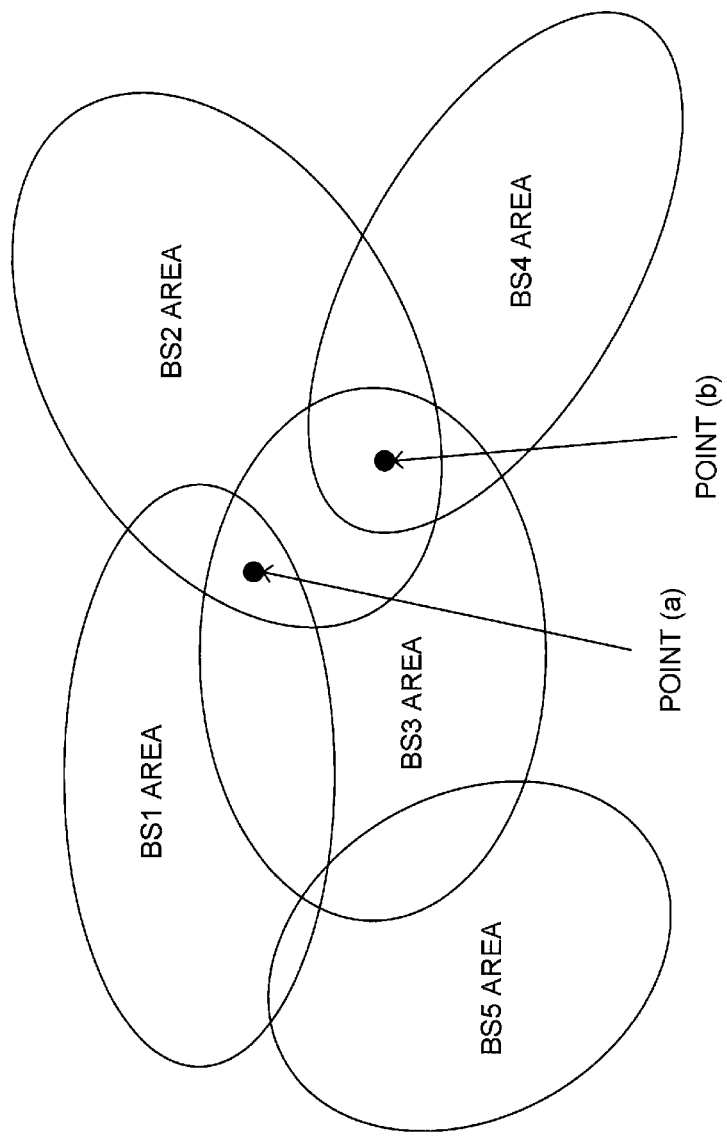
FIG. 4 is a view for conceptually explaining first radio signals transmitted from mobile phone base stations and the positional relationship between them.

The exemplary embodiments of the present invention will now be described with reference to the accompanying drawings.

First Exemplary Embodiment

FIG. 1 is a block diagram showing the arrangement of a mobile communication terminal apparatus according to the first exemplary embodiment of the present invention. A mobile communication terminal apparatus 10 according to this exemplary embodiment includes different wireless communication means and particularly performs power supply control of one wireless communication means based on the position of the apparatus.

As shown in FIG. 1, the mobile communication terminal apparatus 10 according to this exemplary embodiment includes a first wireless communication unit 110, a second wireless communication unit 120, a first position information generation unit 130, a second position information generation unit 140, a wireless communication operation determination unit 150, and a power supply control unit 160.

The first wireless communication unit 110 transmits/receives a first radio signal to/from a first wireless communication base station corresponding to the first radio signal, thereby executing first wireless communication.

The second wireless communication unit 120 transmits/receives a second radio signal to/from a second wireless communication base station corresponding to the second radio signal, thereby executing second wireless communication.

The first position information generation unit 130 generates first position information representing the reception position of the first radio signal based on the first radio signal received by the first wireless communication unit 110.

The second position information generation unit 140 generates, as second position information, first position information at a position where wireless communication is possible between the second wireless communication unit 120 and the second wireless communication base station.

The wireless communication operation determination unit 150 determines, based on the first position information and the second position information, whether the wireless communication operation by the second wireless communication unit 120 is possible.

The power supply control unit 160 controls the power supply of the second wireless communication unit 120 in accordance with the determination result of the wireless communication operation determination unit 150.

Note that the constituent elements of the mobile communication terminal apparatus 10 according to this exemplary embodiment are implemented by installing a computer program (software) in a computer including a CPU (Central Processing Unit), a memory, and an interface. Various kinds of functions of the above-described mobile communication terminal apparatus 10 are implemented by cooperation between the computer program and various kinds of hardware resources of the computer.

The computer program can be provided either in a form stored in a computer-readable recording medium such as a CD-ROM, a hard disk, or a semiconductor memory or in a state readable by the computer via a telecommunication channel.

The operation of the mobile communication terminal apparatus 10 according to this exemplary embodiment will be described next with reference to FIG. 2.

As shown in FIG. 2, first, for position information representing a position where second wireless communication is executable, the second position information generation unit 140 of the mobile communication terminal apparatus 10 generates, as second position information, first position information generated by the first position information generation unit 130 based on a first radio signal received at that position (step S101).

When the second position information is generated, the first wireless communication unit 110 receives the first radio signal (step S102). Upon receiving the first radio signal, the first position information generation unit 130 generates first position information representing the position of the apparatus when the first wireless communication unit 110 has received the first radio signal (step S103).

When the first position information is generated, the wireless communication operation determination unit 150 determines, based on the second position information generated by the second position information generation unit 140 and the first position information generated by the first position information generation unit 130, whether the wireless communication operation by the second wireless communication unit 120 is possible (step S104). The determination result allows the power supply control unit 160 to perform power supply control of the second wireless communication unit 120 (step S105).

As described above, the mobile communication terminal apparatus according to this exemplary embodiment executes power supply control of one wireless communication function unit based on the position of the apparatus. This makes it possible to suppress unnecessary power consumption and prolong the operable time or so-called standby time of the mobile communication terminal apparatus.

In addition, the position information of the mobile communication terminal apparatus is generated using a signal received by the wireless communication means provided in the apparatus. It is therefore possible to suppress unnecessary power consumption of the mobile communication terminal apparatus by easy signal processing at a low cost and prolong the standby time without needing an expensive device, base station information management, and cumbersome signal processing.

Second Exemplary Embodiment

FIG. 3 is a block diagram showing the arrangement of a mobile communication terminal apparatus according to the second exemplary embodiment of the present invention. A mobile communication terminal apparatus 20 according to this exemplary embodiment includes, as different wireless communication means, a wireless communication means by a mobile phone and a wireless communication means by wireless LAN, and performs power supply control of the wireless communication means by wireless LAN based on the position of the apparatus.

As shown in FIG. 3, the mobile communication terminal apparatus 20 according to this exemplary embodiment includes a control unit 200 that controls the operation of each constituent element of the apparatus, a mobile phone function unit 210 that executes wireless communication via a mobile phone communication network, a wireless LAN communication function unit 220 that executes wireless communication by wireless LAN, a storage unit 230, an operation unit 240, and a display unit 250.

The mobile phone function unit 210 transmits/receives a wireless band signal (to be referred to as a "first radio signal" hereinafter) in the mobile phone communication network to/from a mobile phone base station An, thereby executing mobile phone communication.

The wireless LAN communication function unit 220 transmits/receives a wireless band signal (to be referred to as a "second radio signal" hereinafter) in wireless LAN communication to/from a wireless LAN base station B, thereby executing wireless LAN communication.

The storage unit 230 stores information such as programs (software) and various kinds of data. The storage unit 230 is a memory device such as a hard disk, a RAM, or a ROM.

The operation unit 240 is an interface for input information by a user operation or the like. The operation unit 240 is a key input device such as a keyboard or a touch panel.

The display unit 250 is a display device such as a display for displaying image data.

Out of the above-described the constituent elements of the mobile communication terminal apparatus 20, the constituent elements of the control unit 200 concerning power supply control of the wireless LAN communication function unit 220 according to this exemplary embodiment will be explained below in detail.

The control unit 200 includes a position information generation unit 201, a wireless LAN activation position information generation unit 202, a wireless LAN communication operation determination unit 203, and a power supply control unit 204.

Based on the first radio signal transmitted from each of mobile phone base stations A1 to An and received by the mobile phone function unit 210, the position information generation unit 201 generates position information (to be referred to as "first position information" hereinafter) representing the position of the apparatus when the first radio signal has been received and stores the first position information in the storage unit 230.

The first position information generated by the position information generation unit 201 will be described with reference to FIG. 4.

FIG. 4 is a conceptual view showing an example of the positional relationship of the transmission radio wave ranges of a plurality of mobile phone base stations (BS1 to BS5). An example will be described below in which the mobile communication terminal apparatus 20 is located at a point (a) shown in FIG. 4.

As shown in FIG. 4, the mobile phone function unit 210 of the mobile communication terminal apparatus 20 receives the first radio signal transmitted from each of the mobile phone base stations BS1, BS2, and BS3. Hence, the position information generation unit 201 extracts the frequency information of the first radio signal transmitted from the mobile phone base station BS1, base station information for specifying the mobile phone base station BS1, and adjacent base station information for specifying each adjacent base station BS based on the first radio signal from the mobile phone base station BS1. Similarly, the position information generation unit 201 extracts frequency information, base station information, and adjacent base station information corresponding to each of the mobile phone base stations BS2 and BS3. The base station information and adjacent base station information can be extracted from control information contained in the received first radio signal as arbitrary ID data for specifying each base station.

The position information generation unit 201 generates first position information by associating the extracted frequency information, base station information, and adjacent base station information for each base station BS, and stores the generated first position information in the storage unit 230.

Table 1 shows an example of first position information generated by the position information generation unit 201 and representing the point (a) shown in FIG. 4.

TABLE 1

| Frequency information | Corresponding base station information | Adjacent base station information |
|---|---|---|
| abcd.lmn MHz | BS1 (ID: ********) | BS2/BS3/BS5 |
| aefg.lmn MHz | BS2 (ID: ********) | BS1/BS3/BS4 |
| ahij.lmn MHz | BS3 (ID: ********) | BS1/BS2/BS4/BS5 |

The mobile communication terminal apparatus 20 receives the first radio signal from each of the mobile phone base stations BS1, BS2, and BS3. Hence, the position information generation unit 201 stores the extracted frequency information, base station information, and adjacent base station information in correspondence with each other for each of the mobile phone base stations BS1, BS2, and BS3, as shown in Table 1, thereby generating the first position information that uniquely represents the point (a).

The constituent elements of the control unit 200 will further be described.

The wireless LAN activation position information generation unit 202 generates position information (to be referred to as "second position information" hereinafter) representing a position (wireless LAN activation position) where wireless LAN communication is possible as the wireless LAN communication function unit 220 transmits/receives the second radio signal to/from the wireless LAN base station B, and stores the generated second position information in the storage unit 230. The second position information can be the first position information generated by the mobile phone function unit 210 at the wireless LAN activation position. This position information will be referred to as "wireless LAN activation position information".

Table 2 shows an example of first position information representing a point (b) shown in FIG. 4.

TABLE 2

| Frequency information | Corresponding base station information | Adjacent base station information |
|---|---|---|
| aefg.lmn MHz | BS2 (ID: ********) | BS1/BS3/BS4 |
| ahij.lmn MHz | BS3 (ID: ********) | BS1/BS2/BS4/BS5 |
| aopq.lmn MHz | BS4 (ID: ********) | BS2/BS3 |

For example, when the point (b) shown in FIG. 4 is the wireless LAN activation position, first position information generated by the position information generation unit 201 at the point (b) is second position information, that is, wireless LAN activation position information uniquely representing the point (b) corresponding to the wireless LAN activation position.

The wireless LAN communication operation determination unit 203 compares the first position information with the wireless LAN activation position information and identifies whether the contents of these pieces of position information match, thereby determining whether the wireless LAN communication operation by the wireless LAN communication function unit 220 is possible at the position represented by the first position information.

For example, if both the first position information and the wireless LAN activation position information represent the point (a) shown in FIG. 4, the wireless LAN communication operation determination unit 203 can recognize that the two pieces of position information have the same contents by comparing the first position information with the wireless LAN activation position information. That is, the wireless LAN communication operation determination unit 203 can determine that the position represented by the first position information and the wireless LAN activation position are represented by the same position information, and thus determine that the wireless LAN communication operation by the wireless LAN communication function unit 220 is "possible".

On the other hand, if the first position information represents the point (a) shown in FIG. 4, and the wireless LAN activation position information represents the point (b), the wireless LAN communication operation determination unit 203 can recognize that the two pieces of position information have different contents by comparing the first position information with the wireless LAN activation position information. That is, the wireless LAN communication operation determination unit 203 can determine that the position represented by the first position information and the wireless LAN activation position are represented by different pieces of position information, and thus determine that the wireless LAN communication operation by the wireless LAN communication function unit 220 is "impossible".

The power supply control unit 204 executes power supply control of the wireless LAN communication function unit 220 based on the determination result of the wireless LAN communication operation determination unit 203.

For example, if the wireless LAN communication operation determination result of the wireless LAN communication operation determination unit 203 is "possible", the power supply control unit 204 executes power supply control to supply power to the wireless LAN communication function unit 220. On the other hand, if the determination result is "impossible", the power supply control unit 204 executes power supply control to cut off power to the wireless LAN communication function unit 220.

Note that the constituent elements of the mobile communication terminal apparatus 20 according to this exemplary embodiment are implemented by installing a computer program (software) in a computer including a CPU (Central Processing Unit), a memory, and an interface. Various kinds of functions of the above-described mobile communication terminal apparatus 20 are implemented by cooperation between the computer program and various kinds of hardware resources of the computer.

The computer program can be provided either in a form stored in a computer-readable recording medium such as a CD-ROM, a hard disk, or a semiconductor memory or in a state readable by the computer via a telecommunication channel.

The power supply control operation of the mobile communication terminal apparatus 20 according to this exemplary embodiment will be described next with reference to FIG. 5.

Figure 5:
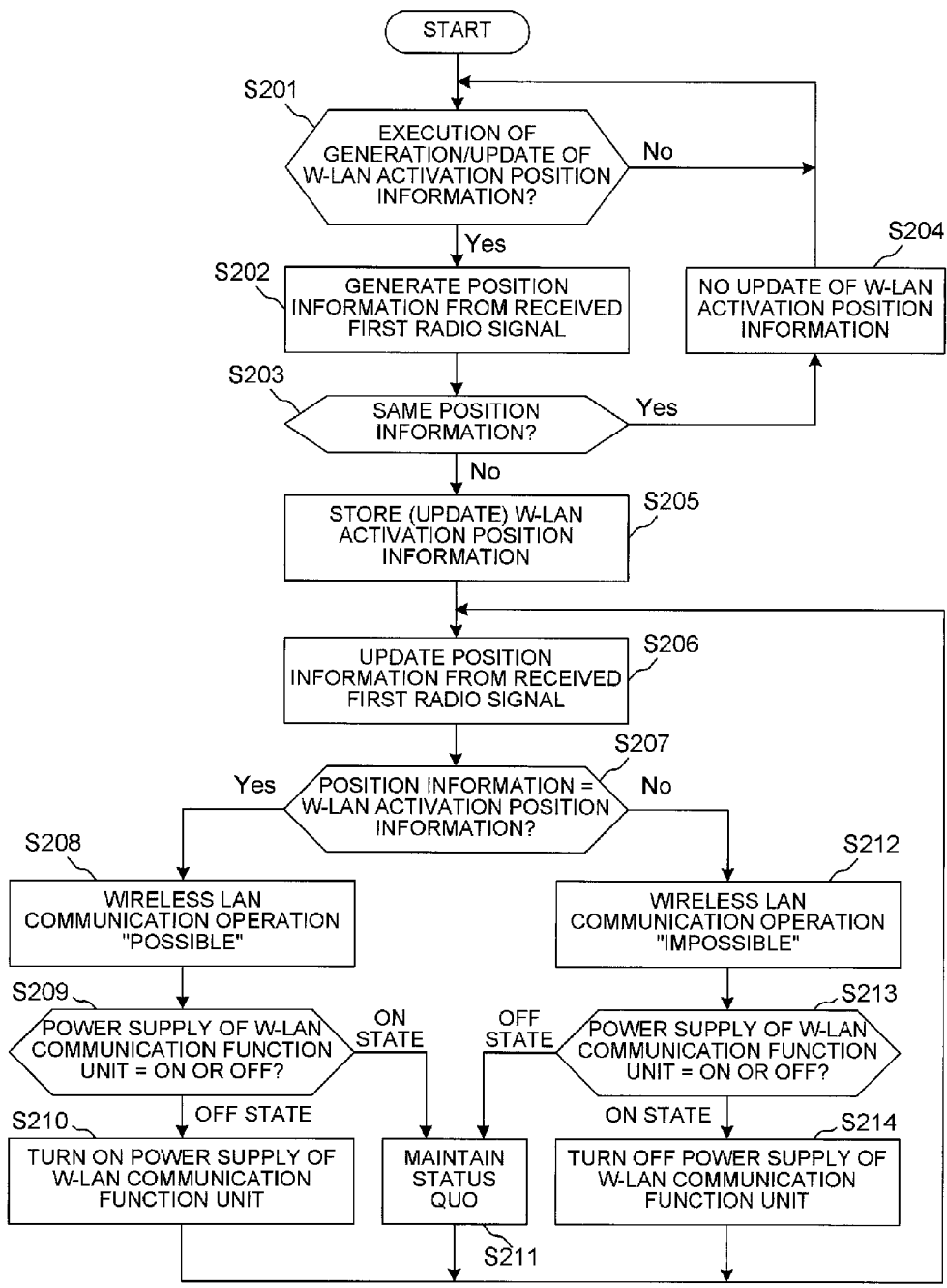
FIG. 5 is a flowchart showing the power supply control operation of the mobile communication terminal apparatus according to the second exemplary embodiment of the present invention.

As shown in FIG. 5, first, the mobile communication terminal apparatus 20 determines whether to generate/update wireless LAN activation position information (step S201). Not to generate/update wireless LAN activation position information ("No" in step S201), the mobile communication terminal apparatus transits to a standby state to generate/update the wireless LAN activation position information. On the other hand, to generate/update wireless LAN activation position information ("Yes" in step S201), the position information generation unit 201 generates the first position information from the first radio signal received by the mobile phone function unit 210 (step S202).

The determination of generation/update of the wireless LAN activation position information can be executed either by a user's explicit operation on the operation unit 240 or automatically on a periodical basis.

When the position information generation unit 201 generates the first position information, the wireless LAN activation position information generation unit 202 determines whether position information having the same contents as those of the generated first position information is stored in the storage unit 230 as wireless LAN activation position information (step S203).

If the same position information is stored ("Yes" in step S203), the wireless LAN activation position information generation unit 202 transits to the standby state without updating the wireless LAN activation position information (step S204). If the same position information is not stored ("No" in step S203), the wireless LAN activation position information generation unit 202 stores the first position information generated by the position information generation unit 201 in the storage unit 230 as wireless LAN activation position information (step S205).

The wireless LAN activation position information stored in the storage unit 230 can be either one piece of position information or a plurality of different pieces of position information.

When the wireless LAN activation position information is generated/updated, the position information generation unit 201 generates first position information from the first radio signal received by the mobile phone function unit 210 again (step S206).

When the position information generation unit 201 generates the first position information, the wireless LAN communication operation determination unit 203 compares the first position information generated again with the wireless LAN activation position information stored in the storage unit 230 and identifies whether these pieces of position information match (step S207).

If the wireless LAN activation position information and the first position information match ("Yes" in step S207), the wireless LAN communication operation determination unit 203 determines that the wireless LAN communication operation by the wireless LAN communication function unit 220 is "possible" (step S208). Based on this determination result, the power supply control unit 204 determines the power supply state of the wireless LAN communication function unit 220 (step S209).

If power is being supplied to the wireless LAN communication function unit 220 ("On state" in step S209), the power supply control unit 204 maintains the power supply state of the wireless LAN communication function unit 220 (step S211). On the other hand, if no power is being supplied ("Off state" in step S209), the power supply control unit 204 executes power supply control to supply power to the wireless LAN communication function unit 220 (step S210).

If the wireless LAN activation position information and the first position information do not match ("No" in step S207), the wireless LAN communication operation determination unit 203 determines that the wireless LAN communication operation by the wireless LAN communication function unit 220 is "impossible" (step S212). Based on this determination result, the power supply control unit 204 determines the power supply state of the wireless LAN communication function unit 220 (step S213).

If no power is being supplied to the wireless LAN communication function unit 220 ("Off state" in step S213), the power supply control unit 204 maintains the power supply state of the wireless LAN communication function unit 220 (step S211). On the other hand, if power is being supplied ("On state" in step S213), the power supply control unit 204 executes power supply control to cut off power to the wireless LAN communication function unit 220 (step S214).

As described above, the mobile communication terminal apparatus 20 according to this exemplary embodiment generates position information uniquely representing the position of the apparatus based on the first radio signal received from the mobile phone base station An, thereby determining based on the position information whether the wireless communication operation by wireless LAN is possible. Power supply control of the wireless LAN communication means can be implemented in accordance with the determination result. This makes it possible to suppress unnecessary power consumption of the mobile communication terminal apparatus 20 and prolong the operable time or so-called standby time of the apparatus.

In addition, the position information of the apparatus can be generated using the mobile phone communication network that is an existing system. It is therefore possible to suppress unnecessary power consumption of the mobile communication terminal apparatus by easy signal processing at a low cost and prolong the standby time without needing an expensive device, base station information management, and cumbersome signal processing.

Third Exemplary Embodiment

Figure 6:
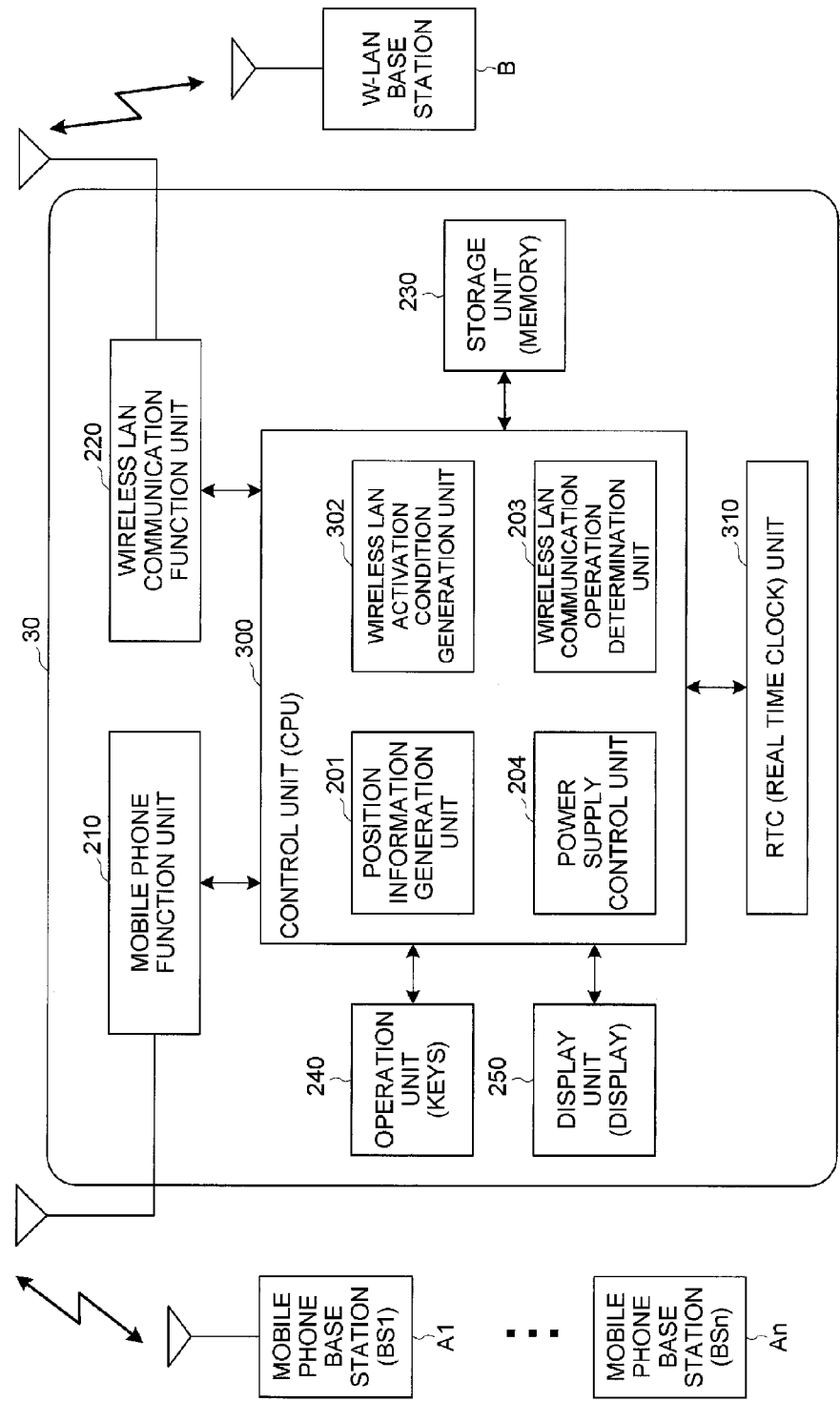
FIG. 6 is a block diagram showing the arrangement of a mobile communication terminal apparatus according to the third exemplary embodiment of the present invention.

FIG. 6 is a block diagram showing the arrangement of a mobile communication terminal apparatus 30 according to the third exemplary embodiment of the present invention.

The mobile communication terminal apparatus 30 according to this exemplary embodiment adds a component for generating time information to the arrangement of the mobile communication terminal apparatus 20 described in the second exemplary embodiment, and performs power supply control of a wireless communication means by wireless LAN based on the time information and the position of the apparatus.

Note that the same reference numerals as in the mobile communication terminal apparatus 20 described in the second exemplary embodiment denote the same components and functions in the mobile communication terminal apparatus 30 according to the third exemplary embodiment, and a detailed description thereof will not be repeated.

As shown in FIG. 6, the mobile communication terminal apparatus 30 according to this exemplary embodiment comprises a mobile phone function unit 210 that transmits/receives a first radio signal to/from a mobile phone base station An, a wireless LAN communication function unit 220 that transmits/receives a second radio signal to/from a wireless LAN base station B, a storage unit 230 that stores programs and data, an operation unit 240 serving as an interface for input information, a display unit 250 for displaying display data, a control unit 300 that controls the operation of each constituent element, and an RTC (Real Time Clock) unit 310 that generates time information.

Note that the RTC unit 310 is a known technique implementable by, for example, an existing IC (Integrated Circuit) dedicated to RTC, and a detailed description thereof will be omitted.

Out of the above-described components, the control unit 300 includes a position information generation unit 201 that generates position information uniquely representing a position based on the first radio signal, a wireless LAN activation condition generation unit 302 that generates an activation condition representing a condition to operate the wireless LAN communication function unit 220, a wireless LAN communication operation determination unit 203 that determines whether to operate the wireless LAN communication function unit 220, and a power supply control unit 204 that executes power supply control based on the determination result of the wireless LAN communication operation determination unit 203.

The function of the wireless LAN activation condition generation unit 302 will be described here in detail.

The wireless LAN activation condition generation unit 302 generates wireless LAN activation position information representing a position (wireless LAN activation position) at which the wireless LAN communication function unit 220 can perform wireless LAN communication by transmitting/receiving the second radio signal to/from the wireless LAN base station B.

In addition, the wireless LAN activation condition generation unit 302 generates activation time information that defines the time to activate the wireless LAN communication function unit 220. The activation time information may be set arbitrary by a user's explicit operation on the operation unit 240 or selected by the user for a predetermined time range.

The wireless LAN activation condition generation unit 302 stores a wireless LAN activation condition in the storage unit 230 by associating the generated wireless LAN activation position information with the activation time information.

The wireless LAN activation condition can be either a condition that associates one piece of activation time information with one piece of wireless LAN activation position information or a condition that associates a plurality of pieces of activation time information with one piece of wireless LAN activation position information. Alternatively, a plurality of pieces of activation time information may be associated with a plurality of pieces of wireless LAN activation position information.

Note that the constituent elements of the mobile communication terminal apparatus 30 according to this exemplary embodiment are implemented by installing a computer program (software) in a computer including a CPU (Central Processing Unit), a memory, and an interface. Various kinds of functions of the above-described mobile communication terminal apparatus 30 are implemented by cooperation between the computer program and various kinds of hardware resources of the computer.

The computer program can be provided either in a form stored in a computer-readable recording medium such as a CD-ROM, a hard disk, or a semiconductor memory or in a state readable by the computer via a telecommunication channel.

The power supply control operation of the mobile communication terminal apparatus 30 according to this exemplary embodiment will be described next with reference to FIG. 7.

As shown in FIG. 7, first, the mobile communication terminal apparatus 30 causes the wireless LAN activation condition generation unit 302 to execute generation/update of a wireless LAN activation condition that is a condition to determine whether to operate the wireless LAN communication function unit 220 (step S301). Whether to execute generation/update of the wireless LAN activation condition can be executed either by a user's explicit operation on the operation unit 240 or automatically on a periodical basis.

The wireless LAN activation condition generation unit 302 determines whether a wireless LAN activation condition having the same contents as those of the newly generated wireless LAN activation condition is stored in the storage unit 230 (step S302). If the same wireless LAN activation condition is stored ("Yes" in step S302), the wireless LAN activation condition generation unit 302 transits to a standby state to generate/update the wireless LAN activation condition without updating the wireless LAN activation condition (step S303).

If the same wireless LAN activation condition is not stored ("No" in step S302), the wireless LAN activation condition generation unit 302 stores the newly generated wireless LAN activation condition in the storage unit 230 by associating the wireless LAN activation position information with the activation time information (step S304).

When the wireless LAN activation condition is stored in the storage unit 230, the position information generation unit 201 generates first position information from the first radio signal received by the mobile phone function unit 210 and updates the position information of the apparatus (step S305).

When the position information generation unit 201 updates the position information of the apparatus, the wireless LAN communication operation determination unit 203 compares the updated position information of the apparatus with the wireless LAN activation position information of the wireless LAN activation condition stored in the storage unit 230 and identifies whether these pieces of position information match (step S306).

If the wireless LAN activation position information and the position information of the apparatus match ("Yes" in step S306), the wireless LAN communication operation determination unit 203 compares the activation time information of the wireless LAN activation condition with the time information generated by the RTC unit 310 and identifies whether the information representing the time contained in the activation time information and information representing the time indicated by the RTC unit 310 match (step S307).

For example, assume that "9:00 AM to 10:00 AM" is contained in the activation time information as the time the wireless LAN communication function unit 220 can be activated. If the time indicated by the RTC unit 310 falls within the range of "09:00:00 AM" to "10:00:00 AM", the wireless LAN communication operation determination unit 203 identifies that the pieces of information match, and otherwise, identifies that the pieces of information do not match.

If the time information contained in the activation time information and the time information generated by the RTC unit 310 match ("Yes" in step S307), the wireless LAN communication operation determination unit 203 determines that the wireless LAN communication operation by the wireless LAN communication function unit 220 is "possible" (step S308).

Based on the "possible" determination result of the wireless LAN communication operation determination unit 203, the power supply control unit 204 executes power supply control to change the power supply state of the wireless LAN communication function unit 220 to the ON state (step S309).

On the other hand, if the wireless LAN activation position information and the position information of the apparatus do not match ("No" in step S306), or the time information contained in the activation time information and the time information generated by the RTC unit 310 do not match ("No" in step S307), the wireless LAN communication operation determination unit 203 determines that the wireless LAN communication operation by the wireless LAN communication function unit 220 is "impossible" (step S310).

Alternatively, the wireless LAN communication operation determination unit 203 can determine that the wireless LAN communication operation by the wireless LAN communication function unit 220 is "impossible" upon detecting that the time information generated by the RTC unit 310 falls outside the time information contained in the activation time information of the wireless LAN activation condition.

Based on the "impossible" determination result of the wireless LAN communication operation determination unit 203, the power supply control unit 204 executes power supply control to change the power supply state of the wireless LAN communication function unit 220 to the OFF state (step S311).

As described above, the mobile communication terminal apparatus 30 according to this exemplary embodiment can determine, based on not only the wireless LAN activation position information but also the activation time information, whether the wireless communication operation by wireless LAN is possible and implement power supply control of the wireless LAN communication means based on the determination result. This enables more flexible power supply control of the wireless LAN communication function.

Hence, it is possible to further suppress unnecessary power consumption of the mobile communication terminal apparatus and prolong the operable time or so-called standby time of the apparatus.

In the second and third exemplary embodiments of the present invention, an arrangement that uses the mobile phone function as the function of generating the position information of the apparatus has been described. However, the same function can be implemented using a wireless communication function of another type, for example, Bluetooth®. Additionally, the present invention is not limited to the matters described in the above exemplary embodiments.

This application is based upon and claims the benefit of priority from Japanese patent application No. 2010-50204, filed on Mar. 8, 2010, the disclosure of which is incorporated herein in its entirety by reference.

INDUSTRIAL APPLICABILITY

The present invention is applicable to a mobile terminal apparatus such as a PHS (Personal Handyphone System) or a PDA (Personal Data Assistance or Personal Digital Assistants: personal mobile information communication device).

EXPLANATION OF THE REFERENCE NUMERALS AND SIGNS

10 . . . mobile communication terminal apparatus, 110 . . . first wireless communication unit, 120 . . . second wireless communication unit, 130 . . . first position information generation unit, 140 . . . second position information generation unit, 150 . . . wireless communication operation determination unit, 160 . . . power supply control unit

The invention claimed is:

1. A mobile communication terminal apparatus comprising:
a first wireless communication unit configured to transmit and to receive a first radio signal;
a second wireless communication unit configured to transmit and to receive a second radio signal to and from a second wireless communication base station;
a first position information generation unit configured to generate, based on the first radio signal received by said first wireless communication unit, first position information representing a position where the first radio signal is received;
a second position information generation unit configured to generate, as second position information representing a position where wireless communication is possible between said second wireless communication unit and the second wireless communication base station, the first position information generated by said first position information generation unit when said second wireless communication unit is transmitting or receiving the second radio signal, and is further configured to store the second position information in a storage unit;
a wireless communication operation determination unit configured to determine, based on whether the first position information generated by said first position information generation unit matches with the second position information stored in the storage unit, whether a wireless communication operation by said second wireless communication unit is possible; and
a power supply control unit configured to perform power supply control of said second wireless communication unit in accordance with a determination result of said wireless communication operation determination unit.

2. The mobile communication terminal apparatus according to claim 1, wherein said power supply control unit is further configured to power on said second wireless communication unit to activate said second wireless communication unit when the determination result of said wireless communication operation determination unit is "possible", and said second wireless communication unit is in an off state, and to power off said second wireless communication unit to stop said second wireless communication unit when the determination result of said wireless communication operation determination unit is "impossible", and said second wireless communication unit is in an on state.

3. The mobile communication terminal apparatus according to claim 1, wherein said first position information generation unit is further configured to generate, as the first position information, information that associates frequency information of the first radio signal received by said first wireless communication unit, base station information for specifying a first wireless communication base station that is a transmission source of the first radio signal, and adjacent base station information for specifying a wireless communication base station adjacent to the first wireless communication base station with each other.

4. The mobile communication terminal apparatus according to claim 1, wherein said wireless communication operation determination unit is further configured to determine whether the wireless communication operation by said second wireless communication unit is possible by comparing activation time information that defines an activation time of said second wireless communication unit with current time information.

5. The mobile communication terminal apparatus according to claim 4, wherein the storage unit is further configured to store the second position information and the activation time information in association with each other.

6. A method of controlling power consumption of a mobile communication terminal apparatus, comprising the steps of:
executing first wireless communication to transmit or to receive a first radio signal between a first wireless communication base station and the mobile communication terminal apparatus;

executing second wireless communication to transmit or to receive a second radio signal between a second wireless communication base station and the mobile communication terminal apparatus;

generating, based on the first radio signal received by the mobile communication terminal apparatus, first position information representing a position where the first radio signal is received;

generating, as second position information representing a position where the second wireless communication is executable, the first position information generated when the second wireless communication is executed;

storing the second position information in a storage unit;

determining, based on whether the first position information, generated when the second wireless communication is executed, matches with the second position information, stored in the storage unit, whether an operation of executing the second wireless communication is possible;

performing power supply control to set a state in which the mobile communication terminal apparatus can execute the second wireless communication when a determination result of the operation of executing the second wireless communication is "possible"; and performing power supply control to set a state in which the mobile communication terminal apparatus cannot execute the second wireless communication when the determination result of the operation of executing the second wireless communication is "impossible".

7. A non-transitory computer-readable recording medium recording a program that causes a computer to execute the steps of:

executing first wireless communication to transmit or to receive a first radio signal between a first wireless communication base station and the mobile communication terminal apparatus;

executing second wireless communication to transmit or to receive a second radio signal between a second wireless communication base station and the mobile communication terminal apparatus;

generating, based on the first radio signal received by the mobile communication terminal apparatus, first position information representing a position where the first radio signal is received;

generating, as second position information representing a position where the second wireless communication is executable, the first position information generated when the second wireless communication is executed;

storing the second position information in a storage unit;

determining, based on whether the first position information, generated when the second wireless communication is executed, matches with the second position information, stored in the storage unit, whether an operation of executing the second wireless communication is possible;

performing power supply control to set a state in which the mobile communication terminal apparatus can execute the second wireless communication when a determination result of the operation of executing the second wireless communication is "possible"; and performing power supply control to set a state in which the mobile communication terminal apparatus cannot execute the second wireless communication when the determination result of the operation of executing the second wireless communication is "impossible".

8. A mobile communication terminal apparatus comprising:

first wireless communication means configured to transmit and to receive a first radio signal;

second wireless communication means for configured to transmit and to receive a second radio signal to and from a second wireless communication base station;

first position information generation means configured to generate, based on the first radio signal received by said first wireless communication means, first position information representing a position where the first radio signal is received;

second position information generation means configured to generate, as second position information representing a position where wireless communication is possible between said second wireless communication means and the second wireless communication base station, the first position information, generated by said first position information generation means when said second wireless communication means is transmitting or receiving the second radio signal, and to store the second position information in a storage means;

wireless communication operation determination means for determining, based on whether the first position information, generated by said first position information generation means, matches with the second position information, stored in the storage means, whether a wireless communication operation by said second wireless communication means is possible; and power supply control means for performing power supply control of said second wireless communication means in accordance with a determination result of said wireless communication operation determination means.

* * * * *